United States Patent Office 2,807,603
Patented Sept. 24, 1957

2,807,603

RIGID SHOCK-RESISTANT VINYL HALIDE POLYMER COMPOSITIONS

Clarence E. Parks, Bay Village, and Garland B. Jennings, Cleveland, Ohio, assignors to The B. F. Goodrich Company, New York, N. Y., a corporation of New York No Drawing. Application May 6, 1953,
Serial No. 353,452

8 Claims. (Cl. 260—45.5)

This invention relates to thermoplastic vinyl halide polymer compositions which possess excellent physical properties including high impact strength and shock resistance, and it relates particularly to hard, tough, rigid, but processable compositions comprising an intimate mixture of a vinyl halide polymer, a polymeric resinous processing aid compatible therewith, a rubbery interpolymer and a polyvalent metal compound.

In the copending application of Garland B. Jennings, Serial No. 211,984, filed February 20, 1951, now U. S. Patent 2,646,417, there is disclosed a new class of hard and rigid thermoplastic compositions which may be readily processed by conventional plastic processing techniques without added plasticizer. These compositions are blends of a vinyl halide polymer, such as polyvinyl chloride, with a hard resinous copolymer of styrene and acrylonitrile. These compositions, while they are tough and hard, are not as shock-resistant as is sometimes desirable in a hard, rigid, plastic composition or product. The use of certain rubbery materials in thermosetting resins, such as phenol-formaldehyde to improve shock resistance, is well known; but when the rubbery materials ordinarily employed in such applications are mixed with the above-identified rigid, vinyl thermoplastic compositions, very inferior products are obtained. The processing characteristics of such a composition are poor, tack is increased and the physical properties of the product in general are greatly harmed. For example, tensile strength, flexural strength, heat distortion point and the like are decreased to such a degree that useful products are not obtained. The copending application of Clarence E. Parks and George L. Wheelock, Serial No. 353,446, filed May 6, 1953, discloses that useful rigid products are obtained by the addition of certain rubbery interpolymers to the Jennings' compositions.

It has now been found that rigid, hard, tough vinyl halide polymer compositions may be prepared which have extremely high impact resistance and at the same time retain good processing characteristics, as well as the many advantages and good physical properties of an unplasticized vinyl halide polymer composition. These improved compositions are intimate mixtures of critical proportions of the vinyl halide polymer, a polymeric resinous polymer compatible therewith such as a styrene-acrylonitrile copolymer resin, a rubbery interpolymer of a butadiene-1,3 hydrocarbon, an acrylonitrile, and at least one other copolymerizable monoolefinic monomer and certain hereinafter defined polyvalent metal compounds. When these ingredients are intimately mixed, as will be hereinafter described, the rigid composition resulting is unusually and surprisingly shock-resistant, is readily processable and, quite unexpectedly, retains essentially all of the desirable properties of the original vinyl halide polymer virtually unimpaired and in good balance.

In accordance with this invention, typical thermoplastic compositions are prepared, for example, by intimately blending, as by mastication and heat, about 100 weight parts of a vinyl halide polymer such as polyvinyl chloride with about 10 weight parts of a resinous styrene-acrylonitrile copolymer, about 10 weight parts of a rubbery interpolymer of 1,3-butadiene, acrylonitrile and styrene, and about 10 weight parts of a basic heavy metal compound such as titanium dioxide. The resulting compositions have Izod impact values of about 17.5. The Izod impact value of a similar mixture of polyvinyl chloride with a styrene-acrylonitrile copolymer only is about 0.5. The compositions of this invention have excellent processing characteristics, and they may be extruded, calendered, molded, drawn, embossed, machined and otherwise treated to form useful rigid shock-resistant products and articles which have an excellent balance of good chemical, physical and electrical properties.

The vinyl halide polymers which are utilized in preparing the compositions of this invention include all of the normally rigid, hard, tough polymeric materials comprised predominately of polymerized vinyl halide, that is, homopolymers of the vinyl halides such as polyvinyl chloride, polyvinyl fluoride and polyvinyl bromide, as well as copolymers containing greater than 50 percent of bound vinyl halide and lesser amounts of other monoolefinic monomers. Multicomponent interpolymers made from monomer mixtures containing predominately a vinyl halide monomer and minor amounts of one or more other copolymerizable monoolefinic monomers may also be employed so long as they are normally rigid copolymers. Such other copolymerizable monoolefinic monomers which may be interpolymerized with the vinyl halides include vinylidene halides such as vinylidene chloride; vinyl esters such as vinyl acetate, vinyl butyrate, vinyl benzoate and the like; acrylic and alpha-alkyl acrylic acids, their alkyl esters, amides and nitriles such as acrylic acid, ethacrylic acid, ethyl acrylate, octyl acrylate, methyl methylacrylate, butylethacrylate, acrylamide, acrylonitrile and the like; vinyl aromatic compounds such as the styrenes including styrene, chlorostyrene, ethyl styrene and the like; vinyl naphthalene; alkyl esters of maleic and fumaric acid such as diethyl maleate; vinyl alkyl ethers and vinyl alkyl ketones; vinyl pyridine; isobutylene and various other copolymerizable monoolefinic monomers; especially those containing the $CH_2=C<$ group. The vinyl halide polymer preferably employed is polyvinyl chloride or vinyl chloride copolymers which contain only minor proportions of other copolymerized monoolefinic monomers such as copolymers of 50, and preferably 70 to 99 percent of vinyl chloride and, for example, about 1 to 30 percent of vinylidene chloride, vinyl esters and acrylic acid esters; or multicomponent interpolymers such as those, for example, containing about 70 to 90 percent vinyl chloride, 5 to 25 percent vinylidene chloride, and 5 to 25 percent vinyl esters such as vinyl acetate, vinyl benzoate, and alkyl acrylates or alkyl methacrylates. Regardless of the particular comonomers employed, the end products of this invention are preferably obtained by employing a normally rigid vinyl halide polymer.

The vinyl halide polymers may be prepared by any of the polymerization techniques known to and employed by those skilled in the art. Such methods as solution, suspension, emulsion and the like are preferred. The polyvinyl chloride preferred for this use is preferably a hard, tough, high-molecular weight material of uniform molecular weight distribution and particle size, so as to take advantage of all of the excellent properties inherent in this material. The form of the vinyl halide polymer may be the solid dried product in powder or granular form; or as a suspension, solution or emulsion, as will be more fully described hereinafter.

The polymeric resinous processing aids employed to prepare the compositions of this invention are preferably styrene-acrylonitrile polymers which are compatible with the vinyl halide polymer. These resins are prepared by polymerizing a monomeric mixture consisting essentially of a styrene and an acrylonitrile. Such mixtures may also contain minor amounts of other copolymerizable monoolefinic monomers of the type hereinbefore described as minor constituents. The styrene utilized is preferably styrene itself. Other useful styrenes include alkyl styrenes such as methyl styrene, ethyl styrene; halostyrenes such as chlorostyrenes represented by monochlorostyrene and dichlorostyrenes; alkoxy styrenes and like styrene derivatives copolymerizable with acrylonitrile. Better results are obtained if the resin contains greater than 50 percent of bound styrene, or is prepared from monomer mixtures containing greater than 50 weight percent of styrene. The acrylonitrile comonomer employed in the monomer mixture is preferably acrylonitrile. Other useful acrylonitriles include alkyl acrylonitriles such as methacrylonitrile and ethacrylonitrile, chloroacrylonitrile and the like, in amounts from 10 to 50 percent in the monomer mixture and resulting copolymer. The other minor monoolefinic constituents, if employed, are preferably less than 20 percent. It is preferred to use, however, polymers prepared from monomer mixtures containing about 65 to 85 weight percent of styrene and 15 to 35 weight percent of acrylonitrile. In any case the styrene-acrylonitrile polymer should be a hard, tough, high-molecular weight thermoplastic material to obtain optimum results from its use with the other components of the composition.

The styrene-acrylonitrile polymers may be prepared by any of the polymerization techniques known to and employed by those skilled in the art. Such methods as solution, suspension, emulsion and the like are preferred. The form of the resin may be the solid dried product in powder or granular form, as a suspension, solution or emulsion, as will be more fully described hereinafter. The amounts of styrene-acrylonitrile polymer employed in the compositions of this invention are from 1 to 40 weight parts per 100 weight parts of vinyl halide polymer. Better results are obtained when using 1 to 20 parts, and the concentration is preferably from 1 to 10 weight parts per 100 weight parts of the vinyl halide polymer.

The rubbery interpolymers employed in the preparation of the polymer compositions of this invention contain a butadiene-1,3 hydrocarbon, an acrylonitrile, and at least one other copolymerizable monoolefinic monomer. The interpolymers are prepared by polymerizing monomer mixtures containing preferably 1,3-butadiene, acrylonitrile, and one or more of styrene, dichlorostyrene, alkyl acrylates, alkyl methacrylates and like monoolefinic comonomers. The monoolefinic comonomers which may be copolymerized with a butadiene-1,3 hydrocarbon and acrylonitrile are well known to those skilled in the art and include such materials as preferably styrene, dichlorostyrene and the like, and also include the alkyl acrylates such as ethyl acrylate, butyl acrylate, hexyl acrylate; alkyl methacrylates such as methyl methacrylate, butyl methacrylate, octyl methacrylate; vinyl alkyl ketones such as vinyl methyl ketone; vinyl alkyl ethers such as vinyl ethyl ether, vinyl pyridine, vinyl napthalene and the like. In general the third monomeric constituent may be a vinylidene compound containing the $CH_2=C<$ group, that is, containing a terminal methylene group attached by a double bond to a carbon atom. Other butadiene-1,3 hydrocarbons such as isoprene and other acrylonitriles such as chloroacrylonitrile may also be employed. The ratio of the monomers by weight employed may be from about 50 to 90 weight percent butadiene-1,3 hydrocarbon, 5 to 30 weight percent of the acrylonitrile, and 5 to 30 weight percent of the other copolymerizable monoolefinic monomers. It is preferred that only three component monomer mixtures be polymerized for the rubbery interpolymers to be used in this invention, but small amounts of other copolymerizable monoolefinic monomers as set forth above may be present in the monomer mixture.

Better results are obtained when the interpolymer used is prepared from monomer mixtures containing from about 60 to 75 weight percent of 1,3-butadiene, from 10 to 20 weight percent acrylonitrile, and 10 to 20 weight percent of another copolymerizable monoolefinic monomer selected from the class consisting of styrenes, alkyl acrylates and alkyl methacrylates. A more preferred interpolymer is prepared from a monomer mixture containing 60 to 70 weight percent 1,3-butadiene, 15 to 20 weight percent acrylonitrile, and 15 to 20 weight percent styrene. The polymer resulting from this monomer mixture contributes the best balance of physical properties to the compositions of this invention.

The rubbery interpolymers may be prepared by any of the polymerization techniques known to and employed by those skilled in the art, but emulsion polymerization is preferred. The interpolymer may be employed as the dry solid polymer, as a cement, dispersion, a latex and the like and at any reasonable degree of conversion, although a conversion between 50 and 100 percent is preferred. The interpolymer is preferably polymerized to a Mooney value of about 25 to 150 ML, and interpolymer with a Mooney value of about 50 to 100 ML is more preferred. The interpolymer preferably has a low gel content to obtain optimum results.

The amount of rubbery interpolymer to be blended with the other ingredients to obtain the outstanding compositions of this invention may be varied within rather broad limits, and one is still able to obtain useful products; but if the advantages of the vinyl halide polymer are to be maintained, the amounts employed to obtain optimum results are rather critical. From 1 to 30 weight parts of interpolymer may be used per 100 parts of vinyl halide polymer and styrene-acrylonitrile polymer. Better results are obtained if 5 to 20 parts are employed, and preferably the amount is from 5 to 15 weight parts per 100 weight parts of the other two constituents.

Unlike the composition described in the before-mentioned Jennings' application, the ingredients of this composition are not completely compatible with each other. When combined in proper proportions, the rubbery ingredient of the composition is not completely compatible with the resinous ingredients, and it is this controlled incompatibility which is believed to be responsible for the unexpected improvement in shock resistance obtained with very little loss of the initial physical properties of the resinous components. A butadiene-styrene copolymer is not compatible at all with the other two resinous materials, and the small degree of shock resistance that is obtained is at the expense of the other physical properties which are greatly degraded. In the composition of this invention, the constituents cooperate to contribute to the vastly improved impact strength, and a good balance of the other desirable physical properties and processability.

The polyvalent metal compounds used in the practice of this invention are certain water-insoluble polyvalent metal compounds. Illustrative compounds of this type include basic lead carbonate, litharge, basic silicate of white lead, dibasic lead phthalate, tribasic lead maleate, lead orthosilicate, basic lead sulphate, alkyl tin oxides, tin oxide, titanium dioxide, ferric oxide and the like. Preferred polyvalent metal compounds include the water-insoluble metal compounds of groups IV and VIII of the periodic table. A more preferred group includes those basic inorganic water-insoluble polyvalent metal compounds of the IVth group of the periodic table. The basic compounds of this group are particularly useful such as titanium dioxide, basic lead carbonate and the like. The man skilled in the art will be aware that many related and equivalent compounds in addition to those listed above may be employed in the practice of the invention. Of course these compounds are employed in a finely-divided form, pigment grade, as is usual in the practice in this art. The amount of water-insoluble polyvalent metal compound ordinarily employed in the compositions is from 5 to 40 weight parts of compound per 100 weight parts of the polymeric constituents to obtain improvement in shock resistance, but larger quantities may be employed as filler material or extenders for reasons of cost, the end use, color and other reasons as are well known in the art. The preferred amount of compound employed to obtain maximum shock resistance and a good balance of other physical properties in these compositions is from 5 to 25 weight parts, and 10 to 15 weight parts for example, with those basic water-insoluble inorganic polyvalent metal compounds of group IV. Larger amounts are often required with materials with lower density such as calcium carbonate and smaller amounts may be required with certain of the organic salts of the polyvalent metals because of the lubricating effect of these compounds, these factors being well known to those skilled in the art and readily compensated for. Mixtures of these polyvalent metal compounds are particularly useful.

In the practice of this invention the ingredients may be mixed in any order and the ingredients may be in any conventional form, but it is preferred that the polyvalent metal compound be added after the polymeric ingredients have been mixed. One preferred method is to blend the two compatible resins, the vinyl halide polymer and the styrene-acrylonitrile polymer, by mixing the dry resin powders and then masticating with heating until a homogeneous sheet is formed. The two resinous components may also be blended in a Banbury mixer or on a plastic mill by first working one resin until a homogeneous sheet is formed, and then adding the other resin with further working until complete homogeneity is obtained. The intermixture of these two components may then be blended with the rubbery interpolymer in a Banbury mixer or on a plastic mill by working the rubbery interpolymer into the resinous blend and then adding the polyvalent metal compound. All of the ingredients may be blended together in such mixing equipment and also by first dissolving each polymer in a mutual solvent, mixing the solutions and then precipitating the polymer blend from the mixed solutions or by taking off the solvent as by evaporation. The separate polymer ingredients may also be prepared by polymerizing in the form of dispersions or emulsions or suspensions, and then blending the suspensions or dispersions and coagulating. These methods give particularly intimate mixtures of the polymeric ingredients. Still another method is to polymerize the monomeric ingredients of one polymer, add to this the monomers of one of the others, and successively continue the polymerization so as to "overpolymerize" the second and third polymers on the particles of the first. The method employed to obtain the mixture of the three polymeric ingredients and the polyvalent metal compound is not critical, the only requirement being that an intimate mixture of all the ingredients be obtained.

Regardless of the method by which the initial blending of the ingredients is accomplished, it is generally preferred that the blended ingredients be worked or masticated under heat and pressure to insure efficient dispersion of the various ingredients in the mixture. The temperature at which the mastication is conducted is not critical, and is dependent to some extent on the thermoplastic character of the two resins and the rubbery interpolymer. Unplasticized polyvinyl chloride is efficiently blended with a styreneacrylonitrile copolymer by mastication at a temperature of about 300° F. The rubbery ingredient may be incorporated into this mixture at this or a slightly lower temperature. In general, temperatures of from about 200° to 400° F. are found to be sufficient to accomplish efficient mastication and mixing of the blended compositions containing the full range of useful and permissible proportions of vinyl halide polymer, styrene-acrylonitrile polymer, rubbery interpolymer and the polyvalent metal compound.

For example, the two resins may be prepared as fine dry powders and mixed on a plastic mill with closely-set heated rolls at about 300° F. The resins fuse after a few passes, and a sheet with a smooth-rolling bank is obtained. To this mixture is added the rubbery interpolymer, and the polyvalent metal compound, and the mixture worked on the mill until good dispersion is obtained. The resulting product may be extruded in pipe sections which have very smooth surfaces. The product may also be readily calendered to form very thin smooth sheets on a four-roll calender at about 350° F. The product may also be press molded, laminated, embossed, cut, drilled, machined and the like. The resulting products are rigid, shock-resistant, have good low temperatures properties, good resistance to heat distortion and an excellent balance of stress-strain properties.

In the following examples will be found specific embodiments of the invention and details employed in the practice of the invention. The tests on all of the resulting samples are standard ASTM tests. All parts are parts by weight.

*Example I*

100 parts of high-molecular weight polyvinyl chloride powder and 10 parts of a resin in powder form, which is made by polymerizing in emulsion a monomer mixture containing 75 parts of styrene with 25 parts of acrylonitrile, are intimately mixed and blended. 100 parts of this resin mixture are placed in a dough-type mixture and 2 parts of a tin mercaptide stabilizer added thereto. 10 parts of titanium dioxide, 2 parts of calcium stearate and a rubbery interpolymer having a Mooney value of 70 ML and prepared by polymerizing a monomer mixture of 67 parts of 1,3-butadiene, 16 parts of acrylonitrile, and 17 parts of styrene in a fatty acid soap emulsion at a temperature of 30° C. with potassium persulfate are mixed with portions of the resin mixture in three different mixes, containing 5, 10 and 30 parts of interpolymer in separate batches. The mixture of components is worked on a close-set two-roll plastic mill at about 300° F. The resulting product is sheeted off the mill and molded in standard test molds for 5 minutes under pressure at 345° F., the molds cooled, and the molded stock removed. If necessary, the samples are machined to the required tolerances. The following test results are obtained on the samples:

|  | Parts of Interpolymer | | |
| --- | --- | --- | --- |
|  | 5 | 10 | 30 |
| Tensile strength, pounds per square inch | 6,100 | 5,400 | 2,500 |
| Flexural strength, pounds per square inch | 13,000 | 10,400 | 5,300 |
| Izod impact, ft. pounds per inch of notch | 1.6 | 17.5 | 19.0 |

The use of less than about 5 parts of the rubbery interpolymer, while resulting in useful products, does not improve the shock resistance very appreciably, and amounts greater than about 30 parts have a deleterious effect on the polymer properties such as tensile strength, although such materials have specialized uses. The tremendous increase in impact resistance obtained when the basic heavy metal compound, titanium dioxide, is employed with the other ingredients, is evident in this example which contains 10 parts of the basic heavy metal compound.

*Example II*

100 parts of the resin mix prepared as in Example I, 10 parts of basic lead carbonate, 10 parts of finely-divided titanium dioxide, 2 parts of calcium stearate, 2 parts of dibasic lead stearate and 12.5 parts of the rubbery interpolymer are intimately mixed on a hot plastic mill, the resulting stock molded and tested. A product having a tensile strength of 5000 pounds per square inch, a flexural strength of 10,000 pounds per square inch, and an Izod impact value of 15 is obtained.

Example III 100 parts of the resin mix prepared as in Example I, 20 parts of finely-divided ferric oxide, 2 parts of a tin mercaptide stabilizer, and 10 parts of the rubbery interpolymer are intimately mixed on a hot plastic mill, the resulting stock molded and tested. A tensile strength of 5600 pounds per square inch, a flexural strength of 11,500 pounds per square inch, and an Izod impact value of 15 are obtained on this composition.

Example IV 100 parts of resin mix prepared as in Example I, 10 parts of basic lead carbonate, 2 parts of dibasic lead stearate, 10 parts of finely-divided titanium dioxide, and 12.5 parts of dry rubbery interpolymer prepared by the emulsion polymerization of a monomer mixture of 80 parts of 1,3-butadiene, 10 parts of acrylonitrile, and 10 parts of n-octyl acrylate, are intimately mixed on a hot plastic mill, and the resulting product molded and tested. The following results are obtained on this stock: tensile strength 4100 pounds per square inch, flexural strength 8700 pounds per square inch, and Izod impact 7.0.

Example V 100 parts of resin mix prepared as in Example I, 10 parts of basic lead carbonate, 10 parts of finely-divided titanium dioxide, 2 parts of dibasic lead stearate, and 12.5 parts of a dry rubbery interpolymer prepared by the emulsion polymerization of a monomer mixture of 67 parts of 1,3-butadiene, 16 parts of acrylonitrile, and 17 parts of methyl methacrylate are intimately mixed on a hot plastic mill, and the resulting product molded and tested. The following test results are obtained on this stock: tensile strength 4850 pounds per square inch, flexural strength 8900 pounds per square inch, and Izod impact 17.

Example VI 100 parts of resin mix prepared as in Example I, 10 parts of basic lead carbonate, 10 parts of titanium dioxide, 2 parts of dibasic lead stearate, and 12.5 parts of a dry rubbery interpolymer with a Mooney value of 85 ML prepared by the emulsion polymerization of a monomer mixture of 67 parts of 1,3-butadiene, 16 parts of acrylonitrile, and 17 parts of dichlorostyrene are intimately mixed on a hot plastic mill, and the resulting product molded and tested. The following test results are obtained on this stock: tensile strength 6100 pounds per square inch, flexural strength 9900 pounds per square inch, and Izod impact 17.8.

Example VII 100 parts of resin mix prepared as in Example I, 10 parts of basic lead carbonate, 10 parts of titanium dioxide, 2 parts of dibasic lead stearate, and 12.5 parts of a dry rubbery interpolymer prepared by the emulsion polymerization of a monomer mixture of 67 parts of 1,3-butadiene, 16 parts of acrylonitrile, and 17 parts of vinylidene chloride are intimately mixed on a hot plastic mill, and the resulting product molded and tested. The following test results are obtained on this stock: tensile strength 5250 pounds per square inch, flexural strength 9600 pounds per square inch, and Izod impact 9.3.

When other rigid vinyls, other styrene-acrylonitrile polymers, other rubbery interpolymers and other water-insoluble polyvalent metal compounds of the types described are similarly employed, useful products of high impact resistance which possess a good balance of other physical properties are obtained.

Other compounding ingredients such as extenders, stabilizers, colors and the like may be employed in preparing the compositions of this invention, as is well known in the art, so long as the balance between impact strength, flexural strength, tensile strength, processability, heat distortion and the like are not affected to such a degree that the composition is no longer useful as a tough, hard, rigid thermoplastic product.

While we have disclosed certain preferred embodiments of the invention in the examples, we do not thereby desire or intend to limit the invention solely thereto, for as has been disclosed, the materials, proportions and methods may be varied within wide limits, and equivalents may be employed without departing from the scope and spirit of the invention, as defined in the appended claims, and it is to these only that we intend to limit the invention.

We claim:

1. The improved, shock-resistant, processable, rigid, thermoplastic composition of claim 7 wherein (1) is comprised predominately of polyvinyl chloride with lesser amounts of other polymerized monoolefinic monomers, (2) is a copolymer of 60 to 90 weight percent of styrene and 10 to 40 weight percent of acrylonitrile and (3) is a rubbery interpolymer of a monomer mixture comprising 50 to 90 weight percent of 1,3-butadiene, 5 to 30 weight percent of acrylonitrile and 5 to 30 weight percent of a comonomer selected from the group consisting of styrenes, alkyl acrylates and alkyl methacrylates, and (4) an inorganic water-insoluble polyvalent metal compound, said metal selected from groups IV and VIII of the periodic table, and said composition containing essentially from 1 to 20 weight parts of (2) based on 100 weight parts of (1) and from 5 to 20 weight parts of (3) based on 100 weight parts of (1) and (2) and 5 to 40 weight parts of (4) based on 100 weight parts of (1), (2) and (3).

2. The improved, shock-resistant, processable, rigid, thermoplastic composition of claim 1 wherein (1) is a hard, tough, high-molecular weight polyvinyl chloride, (2) is a copolymer of 65 to 85 weight percent styrene and 15 to 35 weight percent acrylonitrile, (3) is a rubbery interpolymer of a monomer mixture of 65 to 70 weight percent 1,3-butadiene, 15 to 20 weight percent acrylonitrile and 15 to 20 weight percent of styrene, and (4) is an inorganic water-insoluble polyvalent metal compound, said metal selected from groups IV and VIII of the periodic table, and said composition containing from 1 to 10 weight parts of (2) based on 100 weight parts of (1), 5 to 15 weight parts of (3) based on 100 weight parts of (1) and (2), and 5 to 25 weight parts of (4) based on 100 weight parts of (1), (2) and (3).

3. The improved, shock-resistant, processable, rigid, thermoplastic composition of claim 2 wherein the inorganic water-insoluble polyvalent metal compound is a basic compound of a group IV metal.

4. The rigid composition of claim 3 wherein the inorganic water-insoluble polyvalent metal compound is titanium dioxide.

5. The rigid composition of claim 3 wherein the inorganic water-insoluble polyvalent metal compound is basic lead carbonate.

6. The improved, shock-resistant, processable, rigid thermoplastic composition of claim 2 wherein the inorganic water-insoluble polyvalent metal compound is ferric oxide.

7. An improved, shock-resistant, processable, rigid, thermoplastic composition comprising an intimate mixture of (1) a rigid vinyl halide polymer of a monomer mixture comprised predominately of a vinyl halide and lesser amounts of other monoolefinic monomers, (2) a hard, tough, resinous polymer of a predominately monoolefinic mixture comprising 50 to 90 weight percent of a monomer selected from the class consisting of styrene, alkyl styrenes, halostyrenes and alkoxystyrenes and 10 to 50 weight percent of a monomer selected from the class consisting of acrylonitrile, methacrylonitrile and chloroacrylonitrile, (3) a rubbery interpolymer of a monomer mixture comprising 50 to 90 weight percent of a 1,3-butadiene hydrocarbon, 5 to 30 weight percent of an acrylonitrile and 5 to 30 weight percent of at least one other monoolefinic monomer copolymerizable with the 1,3-butadiene hydrocarbon and the acrylonitrile, and (4) inorganic water-insoluble polyvalent metal compounds, said metal selected from groups IV and VIII of the periodic table, and said composition containing essentially from 1 to 40 weight parts of (2) based on 100 weight parts of (1), 1 to 30 weight parts of (3) based on 100 weight parts of (1) and (2), and 5 to 40 weight parts of (4) based on 100 weight parts of (1), (2) and (3).

8. The method of improving the shock resistance of a normally hard, tough and horny polymer comprising predominately polymerized vinyl halide with lesser amounts of other polymerized monoolefinic monomers, which method comprises mixing with 100 weight parts of the said vinyl halide polymer (1) 1 to 40 weight parts of a hard, tough, high molecular weight polymer of a monomeric material comprising from 50 to 90 weight percent of a monomer selected from the class consisting of styrene, alkyl styrenes, halostyrenes and alkoxystyrenes and 10 to 50 weight percent of a monomer selected from the class consisting of acrylonitrile, methacrylonitrile and chloroacrylonitrile, (2) 1 to 30 weight parts of a rubbery interpolymer of a polymerized mixture comprising 50 to 90 weight percent of a 1,3-butadiene hydrocarbon, 5 to 30 weight percent of an acrylonitrile and 5 to 30 weight percent of at least one other monoolefinic monomer copolymerizable with the 1,3-butadiene hydrocarbon and acrylonitrile, said weight parts of rubbery interpolymer based on 100 weight parts of the two resinous components, and (3) 1 to 40 weight parts of an inorganic water-insoluble polyvalent metal compound, said metal selected from groups IV and VIII of the periodic table, based on 100 weight parts of the rubber and resin components, and then masticating the resultant polymer mixture while heating at a temperature from about 200° to about 400° F. to effect an intimate mixture of the materials.

References Cited in the file of this patent

UNITED STATES PATENTS

| | | |
|---|---|---|
| 2,330,353 | Henderson | Sept. 28, 1943 |
| 2,439,202 | Daly | Apr. 6, 1948 |
| 2,550,139 | Daly | Apr. 24, 1951 |
| 2,646,417 | Jennings | July 21, 1953 |
| 2,652,384 | Sayko et al. | Sept. 15, 1953 |

FOREIGN PATENTS

| | | |
|---|---|---|
| 947,162 | France | Jan. 3, 1949 |